Patented Nov. 22, 1949

2,488,593

UNITED STATES PATENT OFFICE 2,488,593

PROCESS FOR RESOLVING PETROLEUM EMULSIONS

John L. Harlan, Houston, Tex., assignor, by mesne assignments, to Standard Oil Development Company, Elizabeth, N. J., a corporation of Delaware No Drawing. Original application September 14, 1945, Serial No. 616,457, now Patent No. 2,454,382, November 23, 1948. Divided and this application May 26, 1948, Serial No. 29,403

2 Claims. (Cl. 252—333)

The present invention is directed to a method for resolving water-in-oil emulsions.

This application is a division of copending application Serial No. 616,457, filed September 14, 1945, now Patent No. 2,454,382 issued November 23, 1948.

In the petroleum industry water-in-oil emulsions are frequently encountered both in the field and in the refinery. These emulsions comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil," "roily oil," "emulsified oil," and "bottom settlings."

The object of this invention is to provide a novel, inexpensive and efficient process for separating emulsions of the kind referred to into their component parts of oil and water or brine.

Briefly described, this process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent used in the process of the present invention comprises a nitrogenous derivative of a petroleum sulphonic acid body, specifically such sulphonic acid bodies as are derived from petroleum boiling in the lubricating oil range. These nitrogenous derivatives are prepared by reacting petroleum sulphonic acid bodies with concentrated nitric acid. The product of this reaction is a nitro derivative of the sulphonic acid body. These nitro derivatives may be readily reduced by treatment with nascent hydrogen to amino derivatives. When the nitro derivatives are reduced in an alkaline medium, the nitro sulphonate is first reduced to an amino sulphonate and then two molecules of the amino sulphonate condense through the amino radicals with the elimination of ammonia to form a molecule containing two sulphonic acid bodies connected to a nitrogen atom. The hydrogen atoms of the amino groups may be replaced by other radicals or substituents to produce a wide variety of products.

These nitrogenous derivatives may be used in the form of their sodium or ammonia salts or in the form of their calcium, cyclohexylamine or similar oil soluble salts. The nitrogenous sulphonic acid body may be esterified by monohydric or polyhydric alcohols. In the latter case free hydroxyl groups of the polyhydric alcohol may be further esterified with other large organic molecules having demulsifying power, such as Diels-Alder condensation products.

These nitrogenous derivatives of sulphonic acid bodies are particularly effective on the stubborn emulsions which collect in the bottoms of oil storage tanks. Some of these emulsions are very stable and are not capable of resolution by a great many of the commercial demulsifying agents. In general the amino derivatives are more effective than the nitro derivatives, which in turn are more effective than the sulphonic acid bodies per se.

In the following examples are described some of the demulsifying agents contemplated for use in the present invention:

Example I 1000 grams of crude sodium sulphonate from 75 Stock Phenol Extract acid oil (phenol extract of Coastal Crude lubricating oil distillate having a viscosity of 75 seconds Saybolt at 100° F.) were acidified with 100 grams of concentrated sulphuric acid. The sodium sulphonate had the following approximate analysis: 27.6% sodium sulphonate, 1.4% sodium sulphate, 15.5% water and 56.6% oil. The acidified sulphonate was heated to 132° F. while stirring. Stirring was stopped and the mixture allowed to settle 30 minutes. After settling, 104 grams of acid water (69 ml.) were withdrawn and discarded. The acid water still contained the sulphuric acid, sodium sulphate and some iron impurities. The sulphonic acid layer (996 grams) was then treated with 170 grams of concentrated (70%) nitric acid (120 ml.). The acid was added slowly in 10 ml. portions. The first 20 cc. of acid added over a 20 minute period caused the temperature to rise from 90° F. to 126° F. with the production of a slight foam. After the foam subsided, six 10 ml. portions of nitric acid were added slowly, making a total of 80 ml. acid. The temperature remained between about 130 to 135° F. On stirring, the reaction of the nitric acid continued as indicated by a rise in temperature and foaming. After stirring for ten minutes, 40 ml. of nitric acid was added slowly making a total of 120 ml. acid or 170 grams. A slight rise in temperature occurred. After several hours of stirring the reaction mixture was heated to 160° F. At this higher temperature a separation into three phases occurred, (1) an oil layer amounting to 460 grams, (2) a nitro sulphonate layer amounting to 640 grams, and (3) an acid water layer amounting to 64 grams. The oil layer and the acid water layer were withdrawn and discarded. The nitro sulphonic acid layer was then neutralized with about 128 grams of 50% NaOH solution. This sodium salt of the nitro sulphonate is an excellent demulsifier for crude oil water-in-oil emulsions. It is particularly suited for the resolution of the aged tank bottom emulsions which collect in the bottom of oil storage tanks. It is more effective than the original sulphonate used on such emulsions.

Example II

The nitro sulphonate prepared in accordance with Example I was acidified with 200 grams of concentrated hydrochloric acid (36% HCL) and 20 grams of iron powder was added. The mixture was agitated for one day. Hydrogen was given off and the nitro group reduced to an amino group. On standing, an acid layer was separated, withdrawn and discarded. The amino sulphonic acids were then washed with two 100 ml. portions of saturated sodium chloride solution to remove iron chloride formed by the reaction. The washed amino sulphonic acids were then neutralized with 50% sodium hydroxide to a phenolphthalein end-point and diluted with 100 ml. 91% isopropanol. The inorganic salts were allowed to settle and the amino sulphonate layer decanted. This amino sulphonate is an excellent demulsifier for tank bottom emulsions and live oil emulsions. It is more effective than the original sulphonate or the nitro sulphonate.

Example III

Five hundred grams of a 50% aqueous solution of substantially pure sodium sulphonate derived from 75 Stock Phenol Extract Acid oil was nitrated with 300 ml. of 70% nitric acid. The nitric acid was added slowly while stirring with a mechanical mixer. The reaction was vigorous after the addition of the first 120 ml. of acid. The balance of the acid was added slowly as the foam produced by the initial reaction subsided. Heat was liberated and nitric acid fumes were given off at the point of initial reaction. After the reaction of nitric acid and sulphonate was substantially complete, the added water was withdrawn and discarded. The nitro sulphonate layer was neutralized with 40% caustic solution. The sodium salt of the nitro sulphonate was then diluted with isopropanol and allowed to settle for several days. The clear alcoholic solution of nitro sulphonate was then decanted from the inorganic salts and evaporated to a concentration of 61% nitro sulphonate by weight. This material is an excellent demulsifier for crude oil emulsions.

Example IV

One hundred grams of nitro sulphonate as prepared in Example III was reduced to an amino sulphonate by means of zinc dust and sodium hydroxide solution. The sample of nitro sulphonate was placed in a one liter flask equipped with a mechanical stirrer. Two hundred milliliters of 50% sodium hydroxide solution and 50 grams of zinc dust were added. The mixture was stirred. During the first part of the reaction only hydrogen was given off. In the latter part of the reaction, ammonia gas was given off. This evolution of ammonia gas indicated a condensation of the amino radicals. Stirring was discontinued after the evolution of ammonia gas stopped. The reduced nitro sulphonate was decanted into a separatory funnel. The unreacted zinc was washed with isopropanol and the washings combined with the "amino sulphonate." The amino di-sulphonate was then acidified with hydrochloric acid to remove the zinc ion. The amino di-sulphonic acid was then washed with small portions of saturated salt solution and then neutralized with caustic solution. The alcoholic solution of the amino di-sulphonate was allowed to settle to precipitate the inorganic salts. The alcoholic solution was then evaporated to a concentration of 35% amino di-sulphonate. This amino di-sulphonate is particularly well adapted to the resolution of crude oil emulsions such as encountered in the Conroe field (Montgomery County), Texas.

Example V

Seventy-five grams of anhydrous oil free sodium sulphonate derived from the treatment of medicinal white oil stock with fuming sulphuric acid was diluted with an equal part of distilled water and then nitrated with 25 ml. of 70% nitric acid. The reaction of nitric acid and sulphonate did not take place readily. The nitric acid caused a salting out of the inorganic salts and no exothermic reaction occurred. The aqueous acid was allowed to settle and it was then withdrawn and discarded. Fifty milliliters of concentrated nitric acid was then added. This mixture was stirred under a mechanical mixer for three hours, during which time the nitration took place very slowly. The reaction was assisted by the application of external heat to maintain a temperature of 125° F. At this temperature nitration took place very smoothly. After three hours the mixture was allowed to settle. The free acid which separated was pipetted off and discarded. The acid nitro sulphonate was then neutralized with 40% caustic solution and then diluted with a volume of 91% isopropanol. The inorganic salts were allowed to settle. The clear sodium salt of the nitro sulphonate in alcoholic solution was then evaporated to a concentration of 56.5% by weight. This material is an excellent material for the resolution of crude oil emulsions.

Example VI

A small portion of the sodium nitro sulphonate prepared in Example V was agitated with one-tenth its volume of cyclohexylamine hydrochloride. The cyclohexylamine sulphonate so prepared was centrifuged to remove the sodium chloride formed by the double decomposition reaction.

Example VII

In order to demonstrate the effectiveness of the agents of the present invention, comparative tests were made on the effectiveness of these agents, as well as a standard commercial agent and some of the sulphonates from which these agents are prepared. The emulsion employed in these tests was a tank bottom emulsion resulting from storage of Illinois Basin Crude, Martinsville Tank Farm, Ohio Oil Company, a very difficult emulsion to dissolve. The agents employed are designated in the following table as A, B, C, D, E and F.

Agent A was a commercial compound containing 68 weight per cent of petroleum sludge sulphonate.

Agent B was the nitro derivative, the manufacture of which is described in Example III. It was an alcoholic solution containing 61 weight per cent of the nitro derivative.

Agent C was the base sulphonate recited in Example V from which the nitro derivative was prepared. It was an oil solution containing 70 weight per cent of the sulphonate.

Agent D was the nitro derivative, the manufacture of which is described in Example V and was in the form of an alcohol solution containing 56 weight per cent of the nitro sulphonate.

Agent E was the amino di-sulphonate, the preparation of which is described in Example IV and was in the form of an alcoholic solution containing 46 weight per cent of the di-sulphonate.

Agent F was the base sulphonate employed for the preparation of the nitro derivative in Example III and was in the form of an oil solution containing 46 weight per cent of the sulphonate.

In performing these tests, the customary procedure for testing the effectiveness of demulsifying agents was as follows:

100 ml. of the tank bottom emulsion was poured into each of seven 6-ounce prescription bottles. The treating agent was pipetted into each bottle after it has been warmed to 100° F. The bottles were capped and given 100 vigorous shakes to disperse the chemical throughout the emulsion. The bottles were placed in a water bath and the temperature allowed to increase to 115° F. in 15 minutes. At this time observations were made on the condition of the emulsion. Subsequent observations were made at 45 minutes, four hours and seven hours, as listed in the table. After these observations, small samples were taken for centrifuge tests. The oil was diluted with an equal volume of benzene in the centrifuge as is customary in oil field practice. After this dilution the bottle was shaken vigorously and samples of the entire contents of each bottle were taken for centrifuge tests.

The data obtained in these comparative tests were as follows:

sions, the problem is not only to produce pipe line oil, but it is equally important to dispose of the sludge which accumulates in the tanks. Examples B, D and E indicate that the agents of the present invention practically eliminate this sludge problem.

These demulsifying agents are used in the treatment of emulsions in the manner and in amounts customary in the art. In general, one part of demulsifying agent will be used for each 6000 to 10,000 parts of live oil emulsion and for each 1000 to 2000 parts of aged tank bottom emulsion. These demulsifying agents may be used alone or in conjunction with other known demulsifying agents. A particularly suitable combination is the sodium salt of a nitrogenous derivative of a petroleum sulphonic acid body and the calcium or cyclohexylamine salt of the same or another nitrogenous derivative of a petroleum sulphonic acid body. These two types have different solubilities, the first type being more water soluble and the second type being more oil soluble. The combination of the two gives a highly effective demulsifying action.

The nitration according to the present invention is ordinarily carried out at a temperature between about 90° F. and 160° F. The nitric acid appears to react with the sulphonic acid body by splitting off a fraction of the hydrocarbon molecule, or side chain, and combining with the molecule at this point. This mechanism is suggested by the production of fatty acid by-products. The sulphonic acid group is not split off of the molecule. Analytical tests have failed to indicate any free sulphuric acid group resulting from the action of the nitric acid on the sulphonic acid bodies. It is believed that small amounts of nitro paraffins are produced by side reactions, but the nature of these side reactions has not been fully determined.

The method of preparing amino di-sulphonate disclosed herein, particularly in Example IV, is specifically claimed in my copending application Serial No. 616,456, filed September 14, 1945.

| Demulsifying Agent | A | B | C | D | E | F | Blank |
|---|---|---|---|---|---|---|---|
| Ml. of 10% by Vol. aqueous solution of reagent added at 100° F. to 100 ml. emulsion. | 1.0 | 1.0 | 1.0 | 1.0 | 1.0 | 1.0 | |
| After 15 min. at 115° F., ml.: | | | | | | | |
| Oil | 48.0 | 50 | 52 | 51 | 51 | 51 | 45. |
| Sludge | 52.0 | 50 | 48 | 49 | 49 | 49 | 55. |
| Water | 0 | 0 | 0 | 0 | 0 | 0 | 0. |
| After 45 min. at 130° F.: | | | | | | | |
| Oil | 48 | 52 | 55 | 52 | 52 | 52 | 48. |
| Sludge | Tight 52 | Medium 48 | Tight 45 | Medium 48 | Medium 48 | Tight 48 | Tight. 52. |
| Water | 0 | Trace | 0 | Trace | Trace | 0 | 0. |
| After 4 hours temperature raised to 160° F.: | | | | | | | |
| Oil | 55 | 60 | 65 | 61 | 61 | 59 | 59. |
| Sludge | Tight 45 | Very Loose 30 | Very Tight 35 | Loose 9 | Loose 12 | 41 | 41. |
| Water | 0 | 10 | 0 | 30 | 27 | 0 | 0. |
| After 7 hours, 160° F.: | | | | | | | |
| Oil | 55 | 60 | 68 | 61 | 61 | 60 | 60. |
| Sludge | 45 | Very loose 10 | 32 | Very Loose 9 | Very Loose 12 | Medium 35 | 40. |
| Water | 0 | 30 | 0 | 30 | 27 | 5 | 0. |
| *Centrifuged Samples* | | | | | | | |
| Middle Oil Layer: | | | | | | | |
| B. S. | 0 | 0 | 0 | 0 | 0 | 0 | 2.0. |
| Water | 0 | 0 | 0 | 0 | 0 | 0 | Trace. |
| Total | 0 | 0 | 0 | 0 | 0 | 0 | 2.0. |
| Total Bottle: | | | | | | | |
| B. S. | 28.0 | 6.0 | 11.0 | 0.6 | 0.7 | 18.0 | 38.0. |
| Water | 4.0 | 25.0 | 20.0 | 31.0 | 31.0 | 13.0 | Trace. |
| Total | 32.0 | 31.0 | 31.0 | 31.6 | 31.7 | 31.0 | 38.0 |

It will be noted that the oil obtained from the middle oil layer was considered to be of pipe line specification in all cases excepting the blank. However, in the resolution of tank bottom emul- The nature and objects of the present invention having been fully described, what I desire to claim is:

1. A process for breaking a petroleum emulsion of the water-in-oil type which comprises subjecting the emulsion to the action of a treating agent comprising a petroleum sulphonic acid body having a nitro group attached to the hydrocarbon nucleus thereof.

2. A process for breaking a petroleum emulsion of the water-in-oil type which comprises subjecting the emulsion to the action of a treating agent comprising a petroleum sulphonic acid body derived from petroleum boiling in the lubricating oil range and having a nitro group attached to the hydrocarbon nucleus thereof.

JOHN L. HARLAN.

REFERENCES CITED

The following references are of record in the file of this patent:

UNITED STATES PATENTS

| Number | Name | Date |
|---|---|---|
| 1,747,987 | Reddish | Feb. 18, 1930 |
| 2,089,035 | Oberlin | Aug. 3, 1937 |
| 2,153,744 | De Groote et al. | Apr. 11, 1939 |
| 2,231,753 | De Groote | Feb. 11, 1941 |
| 2,238,195 | Thompson | Apr. 15, 1941 |
| 2,245,190 | Griesinger et al. | June 10, 1941 |
| 2,365,853 | Angruss et al. | Dec. 26, 1944 |
| 2,454,382 | Harlan | Nov. 23, 1948 |